March 29, 1949.  F. W. FRINK  2,465,368
INDICATOR CIRCUIT
Filed Aug. 9, 1944

INVENTOR.
FREDERICK W. FRINK
BY
R P Morris
ATTORNEY

Patented Mar. 29, 1949

2,465,368

UNITED STATES PATENT OFFICE 2,465,368

INDICATOR CIRCUIT

Frederick W. Frink, East Orange, N. J., assignor to Federal Telephone and Radio Corporation, New York, N. Y., a corporation of Delaware Application August 9, 1944, Serial No. 548,699

15 Claims. (Cl. 315—23)

This invention relates to indicator circuits and more particularly to indicator circuits for indicating the position of a pulse relative to a fixed reference base.

In certain types of systems, for example, it is desired to locate exactly the frequency of a received pulse of energy within a frequency band through which a receiver tuning is swept, or in cases where it is desired to determine the time displacement of a reflected pulse for the purpose of measuring the distance of the reflecting object. In such cases, it is convenient to provide a pulse measuring circuit upon which the received pulses may be produced relative to a given base line. In this type of circuit the base line may be directly calibrated but a more accurate measurement of the characteristic may be obtained by the use of some indexing mark, preferably produced in timed relation with the sweep voltage, which may be moved along the sweep line for alignment with the pulse it is desired to measure.

It is an object of this invention to provide an indicating circuit and method utilizing effectively a gap in the sweep line trace for alignment with the pulse to be measured.

It is a further object of this invention to provide an arrangement in which an indexing pulse may be combined with the normal sweep circuit voltage to produce a desired indexing gap or brief extremely high acceleration of the sweep voltage.

Figure 1:
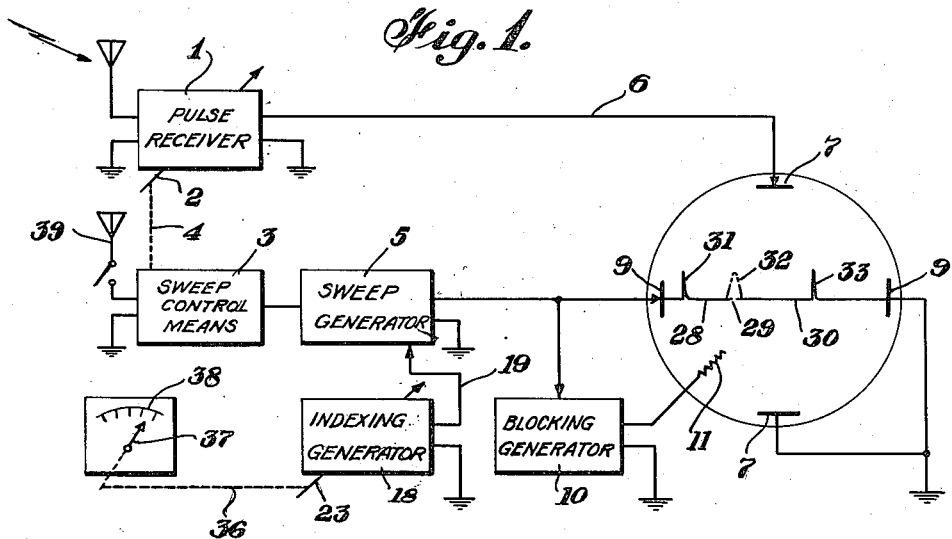
Figure 2:
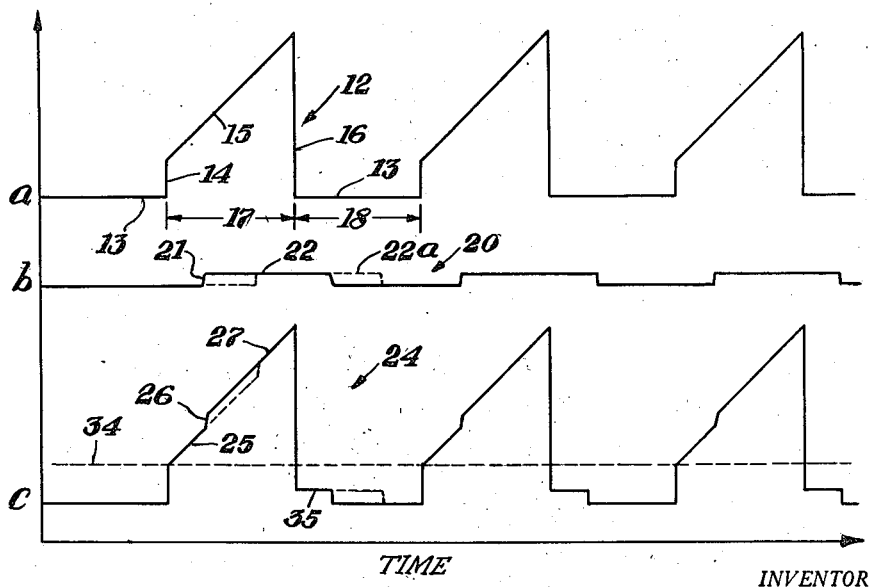

A better understanding of this invention and the objects and features thereof may be had from the particular description of an embodiment thereof made with reference to the accompanying drawing, in which:

Fig. 1 is a schematic block circuit diagram of a system incorporating the features of my invention; and Fig. 2 is a graphical representation of voltage control waves used to explain the operation of the system of Fig. 1.

In the specific example illustrated, I have shown my indicator circuit applied to a system wherein the frequency position of a pulse with respect to a frequency scanning system is indicated. In the system is provided a pulse receiver 1 tunable over a range of frequencies by a tuning means indicated by the arrow 2. A sweep control means 3 serves to control the frequency scanning of the receiver 1 over control connection 4 and simultaneously to control the generation of a sweep voltage in a sweep generator 5. The output pulses from receiver 1 are applied over a line 6 to vertical deflecting electrodes 7 of a cathode ray oscilloscope indicator 8. The sweep voltage from sweep generator 5 is applied to the horizontal deflecting electrodes 9 of indicator 8. A blocking generator 10 coupled to a control grid 11 may be provided, if desired, to extinguish the cathode ray beam except during the period when the applied sweep voltage is above a given level.

The sweep voltage generated in sweep generator 5 is shown generally by way of form 12, curve a of Fig. 2. This voltage preferably follows a given level 13 which may be zero, for a predetermined period then rises substantially instantaneously as shown at 14 to a predetermined value and thereafter gradually rises as shown at 15 over a predetermined sweep voltage period 17 to a predetermined maximum value, thereafter quickly returning as shown at 16 to the predetermined level 13. The period 18 during which the energy is maintained at level 13 is preferably made at least equal to the time duration of sweep period 17 but may be made greater if desired.

An indexing voltage is produced in an indexing generator 18'. This indexing voltage is applied over line 19 to sweep generator 5 in which it is combined with the normal sweep voltage before application to deflecting electrodes 9. The indexing generator may produce a wave 20, curve b of Fig. 2, which voltage rises sharply at 21 from zero to a predetermined level 22 and is maintained at this level 21 for a period substantially equal to the sweep period 17. This indexing voltage may be adjusted in phase position with respect to wave 12 as indicated by arrow 23 of Fig. 1 and as shown in the dotted line position 22A of wave 20.

When the indexing wave 20 is added to sweep voltage wave 12, a resultant combined sweep voltage wave 24, curve c of Fig. 2, is produced. This sweep voltage wave can thus be seen to increase at a uniform level a part of the sweep indicated at 25 and this rises sharply during the period 26. After this sharp rise, the sweep voltage again continues at the same uniform rate of increase as indicated by part 27 of wave 24. It can thus be seen (Fig. 1) that when this composite wave is applied across electrodes 9, it will cause the beam to sweep at a uniform rate for the period 28 then will cause an extremely high acceleration for a short period 29 and thereafter will continue at a uniform rate as shown at 30 of Fig. 1. The extremely high acceleration during period 29 produces effectively in the sweep line a small gap. By adjusting indexing control 23 and the indexing voltage wave 20, this gap may be made to move along the sweep line for alignment with any one of the pulses

31, 32, 33 shown on the screen of indicator 8. In the particular illustration, gap 29 is aligned with pulse 32. Upon reaching this aligned position, the indexing gap will effectively spread pulse 32, making its peak very light or providing an effective gap at the pulse peak so that the operator may readily determine with which pulse the indexing generator is aligned.

Instead of moving the entire pulse 21—22, the pulse may be generated synchronously with the sweep pulses of wave 12, and the indexing generator may serve to adjust the position of the leading edge of the indexing pulse. This leading edge will then serve to provide the accelerating action providing the indexing gap in the trace.

The blocking generator may be caused to block the beam from the cathode ray screen surface at portions of the sweep voltage thereof below a predetermined level such as line 34 of curve c.

It will be clear that when the indexing pulse is adjusted to an indexing position, a certain portion of this indexing pulse will extend beyond the normal time duration of sweep voltage period 17 and would appear in the composite wave as shown at 35 of curve c. However, if the blocking generator is used, the beam will be extinguished during this period. If no blocking generator is used the beam may be deflected sufficiently to one side of the screen so as to produce no increased brightness of the trace during this period.

In order more accurately to read the frequency position of the pulse being indexed, indexing generator control 23 may be coupled by a linkage 36 to a meter arm 37 associated with a meter scale 38 calibrated in suitable units. Thus, on scale 38 the exact frequency at which pulse 32 is received may be quite readily determined.

While I have described the pulse measuring system relative to a frequency scanning receiver system, it is clear that this particular pulse measuring arrangement is as well adapted to measurement of time displacement or distance measurements. When the system is used for distance measurements, sweep control means 3 may serve simultaneously to control sweep generator 5 and to transmit from antenna 39 a pulse for reflection from any reflected object. The reflected pulse then received at receiver 1 will have a time displacement which may be indicated on the trace line produced by sweep generator 5 on indicator 8.

While I have disclosed my invention with respect to a specific embodiment and modifications thereof, it is to be distinctly understood that this description is made only by way of example and not as a limitation on the scope of my invention as set forth in the objects thereof and the accompanying claims.

I claim:

1. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage, and means for applying said sweep voltage to the other pair of electrodes to produce a sweep deflection of said beam during application of said pulses to said one pair of electrodes, a method of producing an index substantially as a break in said sweep line comprising producing said sweep voltage in the form of substantially uniformly increasing voltage waves having a given time duration separated by intervals of substantially the same time duration, producing a substantially rectangular indexing voltage wave having an amplitude low relative to said sweep voltage and having a duration substantially of the same as said given time duration, and combining said indexing voltage and said sweep voltage for application to said other electrodes.

2. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage and means for applying said sweep voltage to the other pair of electrodes to produce a sweep deflection of said beam during application of said pulses to said one pair of electrodes, a method of adjustably indexing a selected one of said pulses comprising producing said sweep voltage in the form of substantially uniformly increasing voltage waves having a given time duration separated by intervals of substantially the same time duration, producing a substantially rectangular indexing voltage wave having an amplitude low relative to said sweep voltage and having a duration substantially the same as said given time duration, combining said indexing voltage and said sweep voltage for application to said other electrodes, and adjusting the time spacing of the leading edge of said indexing voltage with respect to said sweep voltage to align one edge of said indexing voltage wave substantially into coincidence with the position of a selected one of said pulses.

3. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage and means for applying said sweep voltage to the other pair of electrodes to produce a sweep deflection of said beam during application of said pulses to said one pair of electrodes, a system for producing an index substantially as a break in said sweep line comprising sweep voltage means for producing said sweep voltage in the form of substantially uniformly increasing voltage waves having a given time duration separated by intervals of substantially the same time duration, index voltage means for producing a substantially rectangular indexing voltage wave having an amplitude low relative to said sweep voltage and having a duration substantially the same as said given time duration, and combining means for combining said indexing voltage and said sweep voltage for application to said other electrodes.

4. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage, and means for applying said sweep voltage to the other pair of electrodes to produce a sweep deflection of said beam during application of said pulses to said one pair of electrodes, a system for producing an index substantially as a break in said sweep line comprising sweep voltage means for producing said sweep voltage in the form of substantially uniformly increasing voltage waves having a given time duration separated by intervals of substantially the same time duration, index voltage means for producing a substantially rectangular indexing voltage wave having an amplitude low relative to said sweep voltage and having a duration substantially the same as said given time duration, combining means for combining said indexing voltage and said sweep voltage for application to said other electrodes, and means for adjusting the time spacing of the leading edge of said indexing voltage with respect to said sweep voltage to align one edge of said indexing voltage wave substantially into coincidence with the position of a selected one of said pulses.

5. In an indicator circuit of the type wherein a sweep voltage is caused to produce a linear sweep of a cathode ray beam across an indicator screen, an indexing control means adjustable across said screen, comprising means for producing intermittent sawtooth wave voltages of given time duration, the interval between said intermittent sawtooth wave voltages being at least as great as said given duration, means for producing indexing wave voltages of substantially rectangular form having a duration equal to said intermittent sawtooth wave voltages, means for combining said sawtooth wave voltages and said indexing voltages to produce a single composite sweep voltage, and means for adjusting the phase position of at least the leading edge of said indexing voltages with respect to said sawtooth wave voltages.

6. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage, and means for applying said sweep voltage to the other pair of electrodes to produce a sweep deflection of said beam during application of said pulses to said one pair of electrodes, a method of producing an index substantially as a break in said sweep line comprising producing said sweep voltage in the form of substantially uniformly increasing voltage waves having a given time duration, producing a substantially rectangular indexing voltage wave having an amplitude low relative to said sweep voltage, and combining said indexing voltage and said sweep voltage for application to said other electrodes.

7. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage and means for applying said sweep voltage to the other pair of electrodes to produce a sweep deflection of said beam during application of said pulses to said one pair of electrodes, a method of adjustably indexing a selected one of said pulses comprising producing said sweep voltage in the form of substantially uniformly increasing voltage waves having a given time duration producing a substantially rectangular indexing voltage wave having an amplitude low relative to said sweep voltage, combining said indexing voltage and said sweep voltage for application to said other electrodes, and adjusting the time spacing of said indexing voltage with respect to said sweep voltage to align one edge of said indexing voltage wave substantially into coincidence with the position of a selected one of said pulses.

8. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage and means for applying said sweep voltage to the other pair of electrodes to produce a sweep deflection of said beam during application of said pulses to said one pair of electrodes, a system for producing an index substantially as a break in said sweep line comprising sweep voltage means for producing said sweep voltage in the form of substantially uniformly increasing voltage waves having a given time duration, index voltage means for producing a substantially rectangular indexing voltage wave having an amplitude low relative to said sweep voltage, and combining means for combining said indexing voltage and said sweep voltage for application to said other electrodes.

9. In an indicator circuit for selectively indicating a pulse position including a cathode ray indicator having two pairs of deflector electrodes, means for applying pulses to one pair of said electrodes to produce deflection of the cathode ray beam in one direction, a sweep generator means for producing a sweep voltage, and means for applying said sweep voltage to the other pair of electrodes to produce a sweep deflection of said beam during application of said pulses to said one pair of electrodes, a system for producing an index substantially as a break in said sweep line comprising sweep voltage means for producing said sweep voltage in the form of substantially uniformly increasing voltage waves having a given time duration, index voltage means for producing a substantially rectangular indexing voltage wave having an amplitude low relative to said sweep voltage, combining means for combining said indexing voltage and said sweep voltage for application to said other electrodes, and means for adjusting the time spacing of said indexing voltage with respect to said sweep voltage to align one edge of said indexing voltage wave substantially into coincidence with the position of a selected one of said pulses.

10. In an indicator circuit of the type wherein a sweep voltage is caused to produce a linear sweep of a cathode ray beam across an indicator screen, an indexing control means adjustable across said screen, comprising means for producing intermittent sawtooth wave voltages of given time duration, means for producing indexing wave voltage of substantially rectangular form and substantially of said given time duration, means for combining said sawtooth wave voltages and said indexing voltages to produce a single composite sweep voltage, and means for adjusting the position of said indexing voltages with respect to said sawtooth wave voltages 11. An indicator circuit according to claim 10 including means restricting the application of said combined wave voltages to amplitude levels above that of the rectangular wave.

12. A method according to claim 2 including the further step of utilizing the adjustment of the time spacing to indicate the position of a pulse relative to a fixed reference base.

13. A method according to claim 12 where the fixed reference base is a time base and the adjusting for time spacing is made in cooperation with a method of calibration in terms of distance.

14. A system according to claim 4 including means to measure the adjustment of the time spacing to indicate the position of a pulse relative to a fixed reference base 15. A system according to claim 14 where the means to measure the time spacing adjustment includes calibration means calibrated in terms of frequency and sweep control means whereby the sweep voltage is generated in time relation with one end of a band of frequencies which includes the frequencies of pulses to be received.

FREDERICK W. FRINK.

REFERENCES CITED

The following references are of record in the file of this patent:

UNITED STATES PATENTS

| Number | Name | Date |
| --- | --- | --- |
| 2,300,189 | Wolff | Oct. 27, 1942 |
| 2,414,537 | Lakatos | Jan. 21, 1947 |